Sheet 1 - 2 Sheets.
1191X
A. Holmes.
Carding and Spinning Mach.
Patented Jan. 8, 1810.
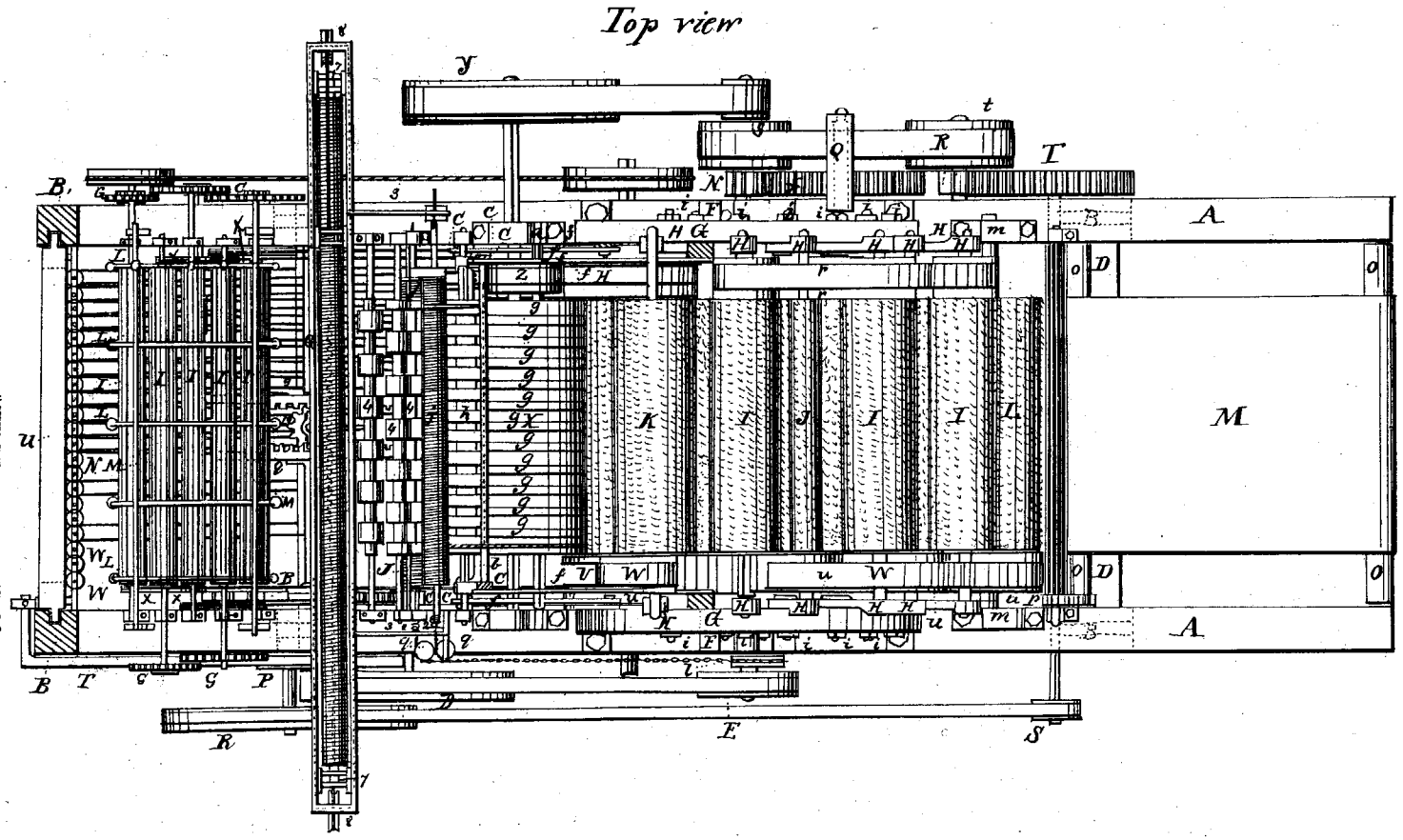
N. PETERS, PHOTO-LITHOGRAPHER, WASHINGTON, D. C.

No Printed Specification Available 1191X
Sheet 2 - 2 Sheets.
A. Holmes.
Carding and Spinning Mach.
Patented Jan. 8, 1810.
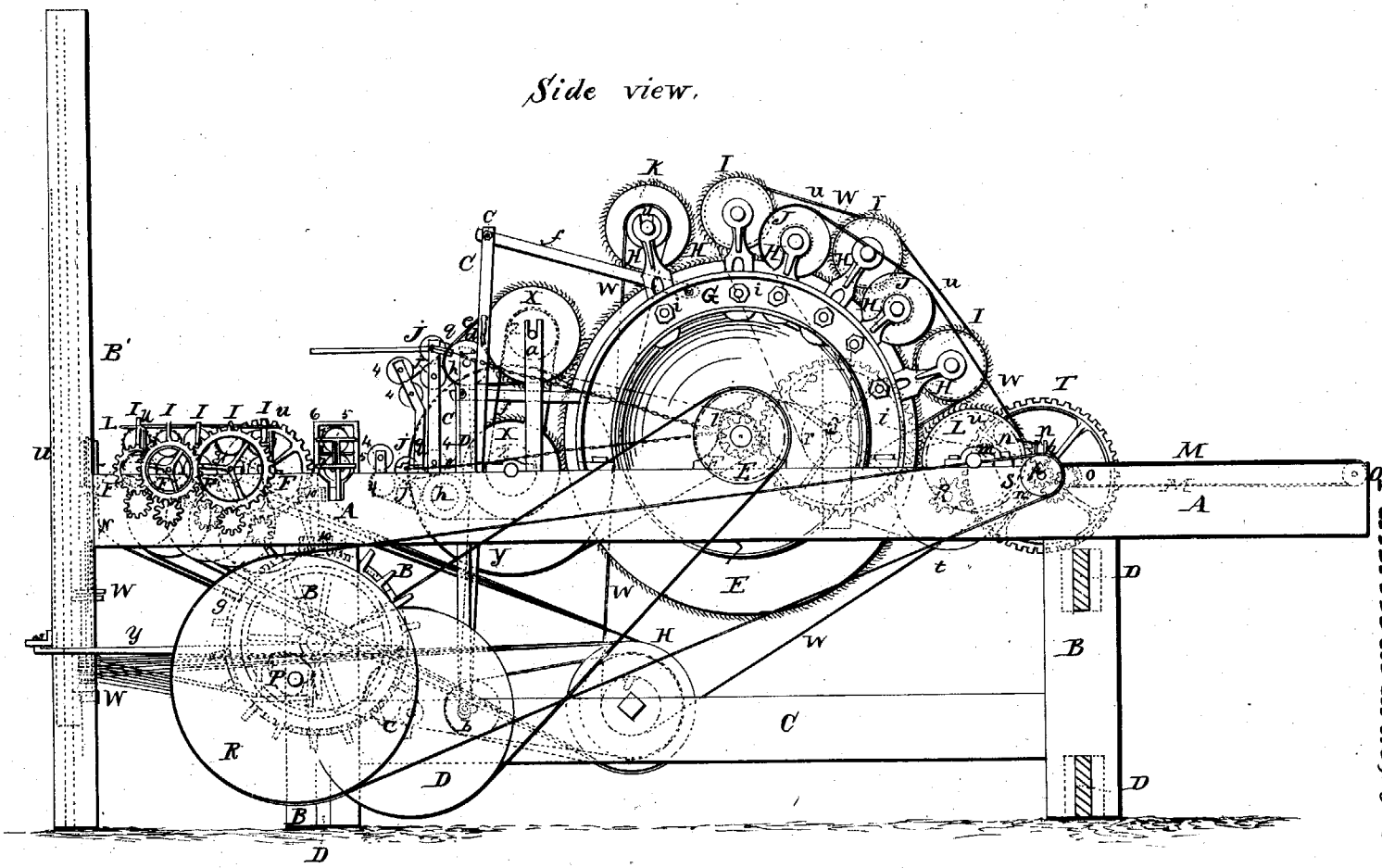
Side view.
N. PETERS, PHOTO-LITHOGRAPHER, WASHINGTON, D. C.

Jan. 8 1810

Alanson Holmes
Letter Patent 1191X

The schedule referred to in these Letters Patent & making part of the same, containing a description in the words of the said Alanson Holmes himself of his machine for carding & spinning wool by one continued operation.

---

The frame of the machine is 10½ feet in length. 3½ feet in breadth and two feet 10 inches in height. consisting of two cap pieces, two posts framed into the cap piece 2 ft. from the end intended for feeding, 2 ft. 3 inches long. Two similar posts framed into the caps 5½ ft. still further toward the finishing end. Two other posts 6½ ft. long framed on to the finishing end of the caps. Two side railing framed into the short posts parallel with the caps 1 foot from the lower end: Two girts framed into the first pair of posts across the frame one directly under the side railing: the other one inch down from the shoulder: a third girt is framed into the second pair of posts directly under the other end of the railings. timber. caps & short posts 7 by 4 inches. side railing. 3 by 6 inches. girts 4 by 6 inches. long posts 3 by 4 inches. main cylinder. 2 ft 10 inches diameter & raised on standards. 3 inches from the caps. & five feet from the feeder end. an arch framed into each cap at the ends of the main cylinder, the circle 1 inch less than the circle of the main cylinder: in which arches are fixed moving screws & standards for the other cylinders. viz: three chain rollers two strippers & fancy. The fore cleaner a cylinder of 9 inches diameter is placed on the caps hung on sliding boxes takes from the feeders & delivers it to the main cylinder. The first chain roller is next hung on the arches & is stripped by the fore cleaner. Then the first stripper & second chain rooler. Then the second stripper & third chain rooler working by pairs. Then the fancy which raises and clears the wool of knots.. The chain roolers 6½ inches in diameter. The strippers 3 inches. the feeders are 1⅞ in. diameter & roll together; drawing the wool from a rooling cloth of 4½ ft. in length on rollers of 2 in. diameter driven by a pinion on one end of the lower. on the same end there is a pinion on the upper feeder to give it motion. The feeders are driven by a gallows wheel washer
on a pinion of 10 cogs on the right hand end of the main shaft the out side of
the frame. This turns a wheel of 60 cogs or teeth. both cast iron & the largest 15
il diameter. the shaft is hung at the out end by an iron strap turned with
square corners, that it may be fastened to the frame & give 8 il room between
the strap and the frame. the other end is hung within the frame and a square
on the end of the shaft still within for a pulley for moving the chain rollers.
a pulley is fixed on the gallows wheel shaft next to the strap of 8 il diameter.
on the shank cog is another pulley of 10 il diameter and round these is a leath.
er strap to give motion. The shank cog and wheel are the same same of the
gallows wheel and washer. The wheel is put on the under feeder shaft and the
pinion or cog is standing to it on a shank through the cap, on the left
hand end of the cylinders. there are pullies on the following shafts. viz: on the
main shaft 1 ft. 11 il on the fancy 4 il on the strippers 7 il on the fore clear
10 il and on the crank shaft under the main cylinder 5½ il and a leath.
er strap to run under the main pully over the stripper pullies. the fore
clearer pully. the crank shaft pully. and the fancy pully and turns all the
pullies united with it. The doffers are the two last cylinders of the carding
part of this machine. These are 9 il diameter & of equal motion placed one
above the other 4 il. apart, and a pully on the second doffer shaft of 1
ft, 8 il diameter and is moved by a pully on the gallows wheel shaft 4
il diameter, a pully on each doffer shaft of equal size to equalize the motion
by a strap. The first doffer is hung on standards from the caps to the
standards for the fancy. The second in sliding boxes on the caps. The crank
is placed directly under the outside doffers, with a pully on it of 5 inches
diameter, & a pully on the crank shaft directly back of it 10 il diameter & a
strap to move it. The bar of the crank as long as the width of of the frame
from inside to inside, with a crank at each end, to sweep a circle at
each end of 1½ il then four staves Two on each crank, standing up by
the doffers for holding the combs, & giving them play, that they may strip
the doffers of wool. one fourth the length of the staves must be above the
combs, which of the shortest is 6 il and the longest 8 il The combs are
thin plates of steel 1 il wide with 10 teeth to an inch 1/8 of an inch deep & fastened to a bar of wood 3/4 of an inch thick 2 i. wide. These are fastened with
screws and nuts to the stakes. For the first doffer the comb is hung to the long-
-est stakes which should be outside. The shortest & inside stakes are use for the
second doffer. at the top of the stakes there are stakes forming right angles
with joints projecting back, to the arches which confine the combs to their place.
The cards are set in the form of the common carding machine — except the
doffers, which are set in rows round the cylinder. The strips for the first 3/8
of an inch wide & set one to every two inches & on the second doffer the
strips are 1 i. wide and set also to every 2 i. the spaces on one must agree
with the cards on the other, that they may take all the wool from the
main cylinder. then is placed to each doffer a roller of 4 i. diameter, with
deep groves made in them of smooth wood or tin to agree with the strips of
cards: hung upon standards, & driven by a cord from the doffer cylinder.—
Then to each are two rollers 6 i. longer than the card cylinder wound with
wire of middling size from end to end, & has two motions first by rolling
together by a cord from the groved rollers, second by traversing to & fro, by an
oval nut on the main shaft, & a chain or strap from the nut drawn over a
a pully to one end of the roller, and a spring. These motions are to draw & roll
the the slivers of wool coming from the rows of cards.] They are hung with stakes
at each end of the rollers projecting forward at right angles 1 ft. long, and
play on a pin. then to each doffer there are put dividing rollers two to the
first and three to the second. The rollers made of tin 2 i. diameter, and the
divisions made of circles of tin 2 i. broad put on to the rollers so as to agree
with the groves in the first rollers. Their gudgeons hang on bars standing in
an angular form so as to bring the sliver into one pair of rollers. Then the
next are two traversing rollers 4 ft. longer than the cards of the machine 2 1/2
i. diameter, wound from end to end with wire of a size that 15 times
round will cover one inch, they are placed in a box with groves in the
sides, and cross pieces for sliding in them. They traverse 1 1/2 ft. a pully at each
end of the box & cards fastened to each cross piece, over the pullies that they
may traverse contrary to each other & this motion must be by turns. in
moving once the length of the box, the motion must be divided into ten
parts, this motion is given by two cast iron cog wheels placed under the rollers of 1½ ft. diameter, with cogs not quite half round the wheel. the wheels must
be alike, the cogs the inward side, to turn a pinion between them, of 4 in. diam-
eter standing upright. with another pinion above it to mash into a bar fas-
tened to the two under cross pieces, with teeth in one side to agree with the
pinion, these pinions turn half the time one way and half the time the other.
By the cogs on the large wheels, being placed on opposite sides, a spur wheel is
put on the same shaft of 1 ft. 5 in. diameter with 20 cogs, and a shaft placed
on a level with that shaft with a pinion of two teeth, which gives the above
mentioned irregular motion. It is driven by a pully on the last said shaft
1 ft. 5 in. and a pully on the main shaft of 9 in. These give a slack twist
to the rove and draw it along at the same time. The drawing rollers are as
follows. 5 fluted iron rollers, 2½ feet long 2½ in. diameter with a shank
for the wheel at one end and only a gudgeon at the other: these and the
traversing rollers are placed on a level, and the standards are fixed for moving
that the draught may be altered according to the length of the wool the me-
dium 3½ in. On the shank end of the rollers, there are cast iron cog wheels of dif-
ferent sizes to increase the motion of the rollers from the first to the last as
follows. 43t. 44t. 45t. 46t. The pinions for driving them has 10 teeth, & the largest wheel
40 cogs. They are driven by a drum under the frame and pullies on the
shanks of the pinions. The pullies 5 in. and the drum according to the motion of
the driving wheel, the large cogwheel should be 1 ft. diameter. on the top of
the iron rollers are short wooden rollers 7½ in. long 2½ in. diameter fluted
and covered, with leather, four to each iron roller, they are pressed down by
short iron levers fastened at one end and a weight at the other, these levers
are confined by bars of iron lying across the rollers, though not touching
them. but supported by bars across the the frame. The fliers are made with
spindles 1 ft. 5 in. long, 1 ft. round and the rest of it square – excepting a gud-
-geon at the end – it is hung at each end by the shoulders of the square
part. A pully of 1½ in. diam. is put on the square, a tin cup or flier of 1¾
inch's diameter, 5 in. long screwed on to the round part of the spindle at
the end; and a spool to traverse up and down within the cup. –
The spindles must point towards the last set of rollers, standing in a perpen-
-dicular form half above and half below – the thread runs over the cup and

990

1191X

425.

is led from one end to the other of the spool by the traverse motion.
This motion is given by a heart wheel near the back end of of the machine
by the feeders and is driven by a cord from the under feeder shaft & a
small pully of 4 in. diameter to a large pully on the heart wheel shaft of
2 ft. diameter; then long levers with a cross piece under the heart. The levers
are hung two thirds [illegible] from the heart to the gate. The gate stands between
the long posts consisting of two side pieces 5 ft. long for sliding in the groves
prepared for them, with bars across for the ends of the spools to rest upon
to give the draught to the thread, and by raising and falling gives the
traverse motion. The caps must be 6 in. from the rollers. The spindles are sup-
-ported by bars across the posts. The drums for driving the spindles, are placed
back of the spindles 3 ft. and are one foot diameter and a band from the
drum to each whirl on the spindles. One drum to each sett of spindles lying
level which gives a half cross to the bands. No exact rule can be given for
the moving parts of the machine, as the driving wheel cannot be always
alike. The sizes of many of the pullies may be calculated from the size and
motion of the drums they must agree one part with another so as gently to
draw and not break the rove. The number of spindles cannot be deter-
-mined for the card may be longer or shorter as best suits the builder. 24
is recommended to a 2 ft. card.

Witnesses
Jonathan Brigham
Seth Spencer.

Alanson Holmes

Drawing made
A. C. H.

Exd.
H.G.C.

23 [illegible]